Sept. 22, 1936.    L. G. KRAEMER ET AL    2,054,985
EDGE GRINDER FOR OPTICAL LENSES
Filed Nov. 19, 1934    2 Sheets-Sheet 1

LAWRENCE G. KRAEMER
GEORGE W. BURROUGHS
INVENTORS

BY Ely Pattison.
ATTORNEYS

WITNESS:

Sept. 22, 1936. L. G. KRAEMER ET AL 2,054,985
EDGE GRINDER FOR OPTICAL LENSES
Filed Nov. 19, 1934 2 Sheets-Sheet 2
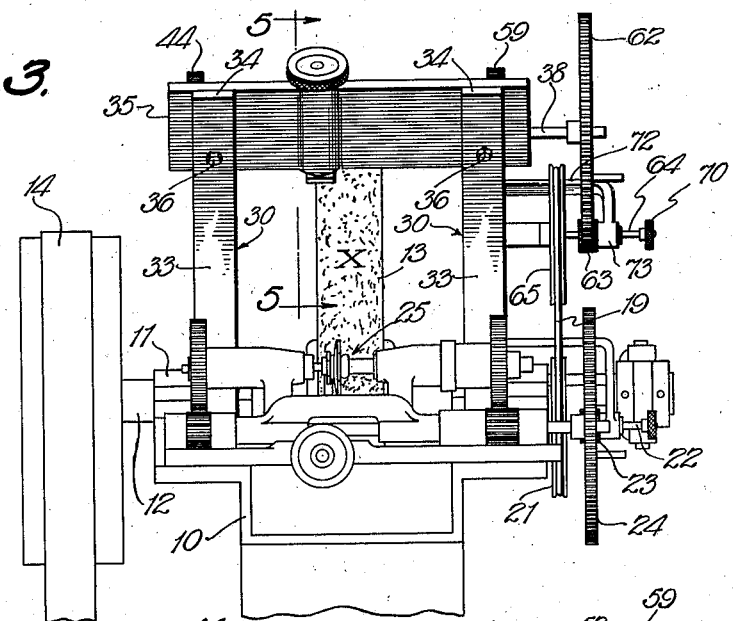
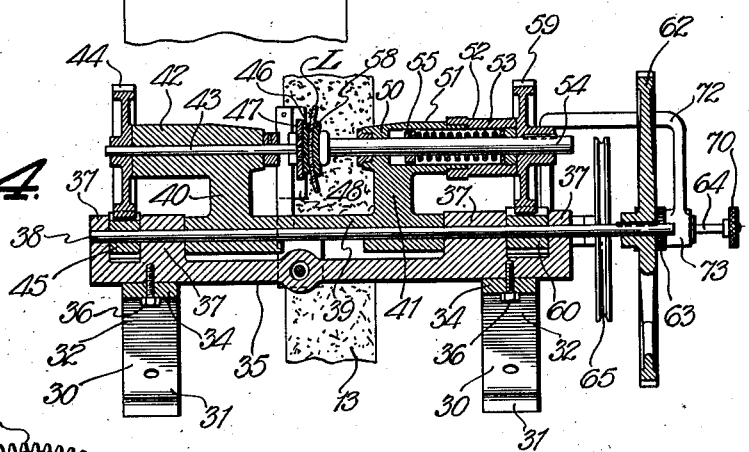
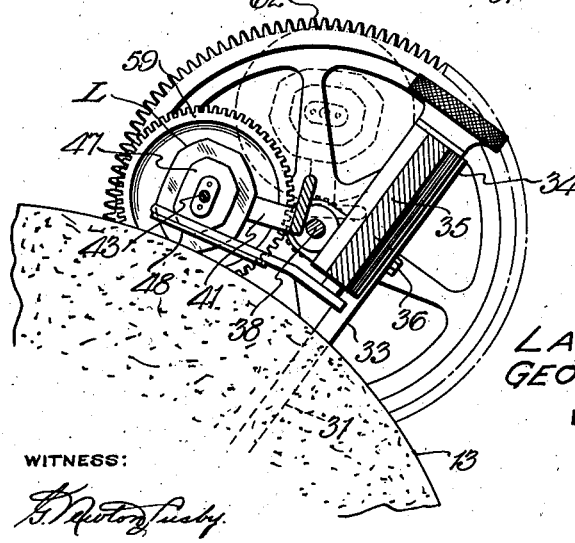
LAWRENCE G. KRAEMER
GEORGE W. BURROUGHS
INVENTORS Patented Sept. 22, 1936

2,054,985

UNITED STATES PATENT OFFICE 2,054,985

EDGE GRINDER FOR OPTICAL LENSES

Lawrence G. Kraemer, Maspeth, and George W. Burroughs, Ridgewood, N. Y., assignors to Gotham Optical Instrument and Machinery Corp., New York, N. Y., a corporation of New York Application November 19, 1934, Serial No. 753,604

5 Claims. (Cl. 51—101)

This invention relates to new and useful improvements in machines for operating upon optical lenses and more particularly, it pertains to improvements in machines known as optical lens edge grinders.

Machines for grinding optical lenses as they are generally constructed are necessarily slow in their operation and it is the primary object of the present invention so to construct such machines, that their output may be materially increased.

A feature of the invention resides in a new and novel combination and arrangement of parts whereby a plurality of optical lenses may be simultaneously operated upon by a single machine.

A further feature of the invention resides in a novel construction whereby a conventional edge grinding machine constructed for operation upon a single lens may be converted into a machine for operation upon a plurality of lenses simultaneously without altering the construction of said machine.

Still a further feature of the invention resides in a novel construction and arrangement of parts whereby the source of power, the driving mechanism and the grinding stone of a machine for grinding the edges of optical lenses may be utilized to drive a plurality of lens holding heads without alteration of the construction thereof.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 1:
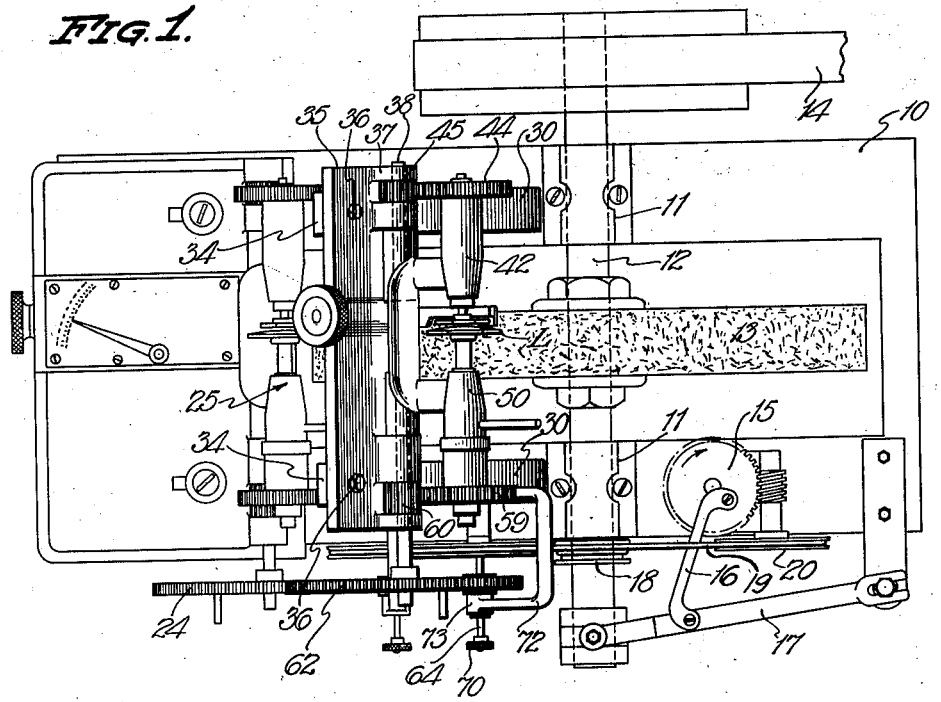
Figure 2:
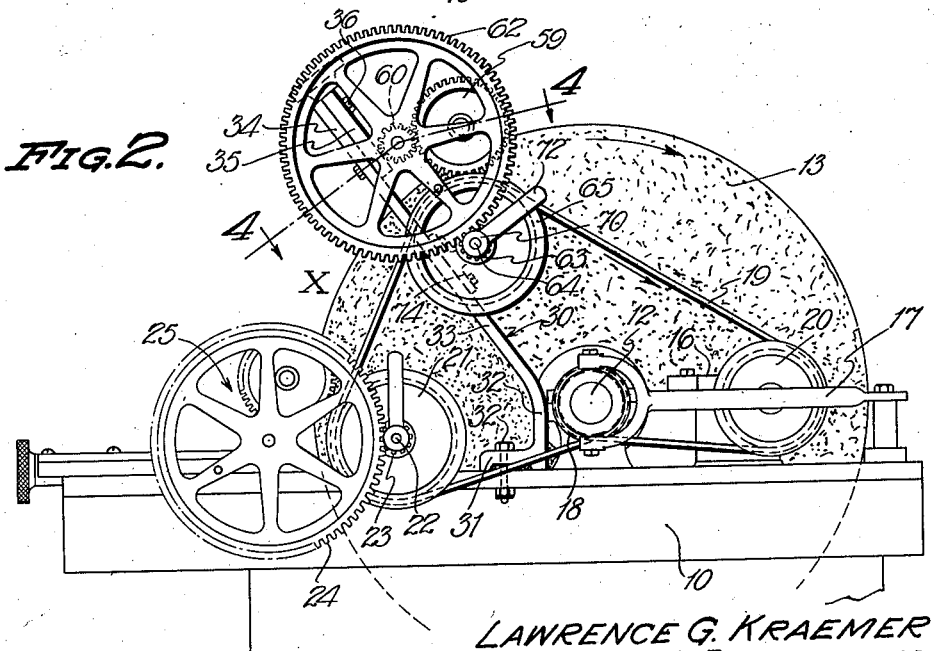

Figure 1 is a top plan view of a lens grinding machine illustrating a device constructed in accordance with the present invention attached thereto, the device of the present invention being shown in heavy lines and the conventional machine being shown in lighter lines, Figure 2 is a similar view in side elevation, Figure 3 is a similar view in front elevation, Figure 4 is a detail sectional view taken on the line 4—4 of Figure 2, and;

Figure 5 is a detail sectional view taken on the line 5—5 of Figure 3.

Referring more particularly to the drawings, the reference character 10 designates a base or supporting bed which is of rectangular form. Mounted thereon in bearings 11 there is a shaft 12 which carries a grinding stone 13. The shaft 12 is driven by a belt 14 from any suitable source of power, and through the medium of the mechanism 15 and the cranks and levers 16 and 17, the shaft 12 is capable of longitudinal movement to move the grinding stone 13 relative to the article operated upon, which in the present instance is the edges of optical lenses. Upon the end of the shaft 12 opposite to that upon which the power is received from the belt 14 there is a pulley 18, and looped around the same there is a driving belt 19 which also passes around a pulley 20 to drive the mechanism 15. This driving belt 19 also passes around a pulley 21 mounted upon a shaft 22, which latter carries a gear 23 meshing with a gear 24, which drives the mechanism of the head 25 which is of conventional form.

So far as described, the machine is of the conventional type for grinding the edges of optical lenses. Such machines, however, have disadvantages amongst the greatest of which is the lack of speed of operation, and as heretofore stated, it is one of the objects of this invention so to construct an attachment for such machines that a greater amount of work can be accomplished thereby.

To the above ends we provide two brackets 30 which are adapted to be connected to the supporting bed at opposite sides thereof. Each bracket 30 has a foot portion 31 through which a bolt 32' passes, said bolt also passing through a portion of the supporting bed 10, as best illustrated in Figure 2. These bolts provide the means for attaching the brackets 30 to the supporting bed. Each bracket has a relatively short vertically extending portion 32 and an angular portion 33 which extends upwardly and forwardly of the grinding wheel 13. The upper ends of these brackets are designated 34 and are connected by a relatively flat transversely extending plate 35. This plate is preferably removably secured in position by bolts 36 in order that it may be removed from the upper ends of the brackets 30. This plate 35 is so constructed and arranged as to carry a grinding head and to this end the plate is provided at each end with a pair of bearings 37 preferably formed integral with the plate and in these bearings there is mounted a shaft 38. Between the inner bearings 37 a yoke member 39 is mounted. This yoke member 39 has two projecting arms 40 and 41 pivotally supported on the shaft 38, and these arms 40 and 41 are adapted to carry the lens gripping and holding means, the lens being designated L. The arm 40 has a bearing 42 in which is mounted a shaft 43 upon the outer end of which is secured a gear 44. This gear 44 is keyed to the shaft 43 and meshes with a gear 45 mounted between the bearings 37, and keyed to the shaft 38 whereby, as the shaft 38 is rotated, the gear 44 and the shaft 43 will be driven. The reference character 46 designates one member of a lens gripping mechanism, and the reference numeral 47 designates a pattern cam riding against a bearing plate 48, these latter two elements being of conventional design.

Carried by the arm 41 there is a bearing 50 from which projects a tubular extension 51. Having threaded engagement with the tubular extension 51 there is a tubular member 52, and mounted within these tubular members 51 and 52 there is a shaft 54 which surrounds a shaft 54 and exerts its pressure upon a collar 55 suitably secured to the shaft. Upon the inner end of the shaft 54 there is a lens gripping member 58 which cooperates with the lens gripping member 46 heretofore mentioned, to grip the lens L, the lens being held between the two members 46 and 58 by the spring 53 exerting its pressure upon the collar 55. Keyed to the shaft 54 there is a gear 59 which is of the same size as the gear 44, and this gear 59 meshes with a gear 60 similar in all respects to the heretofore mentioned gear 45 and keyed to the shaft 38.

The shaft 38 is driven by a gear 62 which is keyed thereto, the gear 62 being driven by a small gear 63 carried by a shaft 64. Mounted on the shaft 64 there is a pulley 65, and the driving belt 19 heretofore mentioned passes around the pulley 65 to transmit the power of the shaft 12 thereto.

From the foregoing it will be apparent that when the shaft 12 is driven, that through the medium of the belt 19 and the pulley 65 the shaft 64 will be driven to drive the gear 62 and the shaft 38. The shaft 38 through the medium of the gears 45 and 60 will drive the gears 44 and 59 to rotate the shafts 43 and 54 and cause a rotation of the lens L and the pattern cam 47, to grind the edge of the lens, the grinding stone 13 being driven by reason of the fact that it is carried by the shaft 12. As more clearly illustrated in Figures 4 and 5 of the drawings it will be evident that since the lens carrying head is freely supported on the shaft 38 in a position above the horizontal center line of the grinding stone that the edge of the lens will normally rest against the periphery of the stone by gravitation, as illustrated by the full lines in Figure 5, and when it is desired to remove or replace the lens the supporting head may be swung upwardly out of engagement with the grinding stone as shown by the dotted lines in said figure.

The shaft 64 is so mounted that it may be moved longitudinally to disengage the gear 63 carried thereby with respect to the gear 62, and thus eliminate the driving of the upper lens supporting head when the same is not desired for use and for the purpose of moving this shaft longitudinally a finger piece 70 is mounted on the end thereof. For better supporting the shaft 64 there is a frame 72 which has a bearing 73 in which the shaft is mounted, and which is rigidly connected as at 74 to one of the brackets 30 in any desired manner.

It will be noted that the brackets 30 are so designed that the upper lens supporting head is spaced with respect to the lower lens supporting head 25, which gives access to the grinding stone 13 at a point designated X in Figure 2 and leaves this portion of the stone free for hand work, such as grinding off the sharp edges of a lens after the edge grinding operation has been completed.

From the foregoing it will be apparent that the present invention provides a new and novel means whereby a plurality of lenses may be subjected to the edge grinding operation simultaneously upon a single machine and from a single source of power, and that at the same time a portion of the grinding stone is free for use in hand grinding.

Having thus described the invention, what is claimed as new, is:

1. A lens grinder comprising in combination a grinding wheel, a lens carrying head, a lens rotatably carried thereby and a support for positioning the head substantially at a 45° angle, said head being pivotally mounted on the support and extending upwardly therefrom in a position to cause the edge of the lens to rest against the wheel by gravitation at a point below the horizontal plane of the pivot of the head and with the axis of the lens positioned above the horizontal plane of said pivot.

2. A lens grinder comprising in combination a base, a grinding wheel rotatably mounted on the base, a support rising from the base substantially at a 45° angle and a lens carrying head pivotally mounted on the upper side of the support and extending upwardly therefrom in a position to cause one edge of a lens to rest against the wheel by gravitation at a point below the horizontal plane of the pivot of the mount.

3. A lens grinder comprising in combination a base, a grinding wheel rotatably mounted on the base, a support rising from the base substantially at a 45° angle, a lens carrying head pivotally mounted on the upper side of the support and extending upwardly therefrom and a lens rotatably carried by the head with one edge gravitating against the wheel in a position below the horizontal plane of the pivot of the head and with the axis of the lens positioned above the horizontal plane of said pivot.

4. A lens grinder comprising in combination a base, a grinding wheel journalled thereon, a main lens carrying head mounted on the base, a bracket member, a lens support adjustably carried by the bracket, a second lens carrying head pivotally supported by the bracket member and extending upwardly from the bracket, lens gripping members rotatably mounted on each of the heads, each gripping member securing a lens and lens pattern in co-axial arrangement, with the lens in grinding engagement with the wheel and with the pattern adapted to engage the pattern support and common drive means for said gripping members, said bracket extending upwardly from the base at a predetermined angle to support said second lens carrying head in a position to cause the lens carried thereby to rest against the wheel by gravitation and with the axis and grinding edge of the lens respectively above and below the horizontal plane of the pivot of the second lens grinding head.

5. A lens grinder comprising in combination a base, a grinding wheel rotatably mounted on the base, a support rising from the base substantially at a 45° angle and a lens carrying head pivotally mounted on the upper side of the support and extending upwardly therefrom in a position to cause one edge of a lens to rest against the wheel by gravitation at a point below the horizontal plane of the pivot of the mount said bracket comprising a pair of legs positioned at opposite sides of the wheel and a cross member connecting the upper ends of the legs and providing bearing means for the head.

LAWRENCE G. KRAEMER.
GEORGE W. BURROUGHS.